Sept. 25, 1962 P. A. CRANDELL 3,056,080
PARAMAGNETIC WAVEMETER
Filed Aug. 17, 1959 2 Sheets-Sheet 1

INVENTOR.
PAUL A. CRANDELL
BY Kenway, Jenney,
Witter & Hildreth
ATTORNEYS

Sept. 25, 1962   P. A. CRANDELL   3,056,080
PARAMAGNETIC WAVEMETER
Filed Aug. 17, 1959                           2 Sheets-Sheet 2

*INVENTOR.*
PAUL A. CRANDELL
BY *Kenway, Jenney,*
*Witter & Hildreth*
ATTORNEYS

United States Patent Office 3,056,080
Patented Sept. 25, 1962

3,056,080
PARAMAGNETIC WAVEMETER
Paul A. Crandell, Bedford, Mass., assignor to National Company, Inc., Malden, Mass., a corporation of Massachusetts
Filed Aug. 17, 1959, Ser. No. 834,171
4 Claims. (Cl. 324—.5)

My invention relates to a novel method and apparatus for measuring frequencies in the high radio frequency (hereinafter "RF") and microwave regions; in particular it relates to a method and apparatus which makes use of the electron and nuclear resonance effects respectively, of appropriate source materials in the determination of the desired frequency.

In many measurements frequency is the independent variable against which other parameters are plotted. If the results of such measurements, e.g. gain band width products, circuits Q's, resonance, etc., are to be meaningful, a reliable measurement of frequency is required. Similarly, in the calibration of other high frequency measuring instruments, a dependable frequency standard is necessary whose frequency is known rather exactly.

In the low frequency regions, i.e. up to about 30 megacycles, frequency can be measured with great accuracy by employing frequency counters which measure the output of the unknown frequency source against an oscillator controlled by a crystal in a temperature controlled environment as a standard. With this technique, measurements which have an accuracy of 1 part in $10^6$ can be carried out consistently and reliably.

At the higher RF and microwave frequencies, however, frequency counters are useful only when a heterodyning process is employed for the crystal controlled oscillator. When this technique is used, the frequency of the crystal-controlled counter is multiplied in several steps through lumped and distributed parameter circuits. Many stages of multiplication are necessary to arrive at an X- or K-band, frequency (approximately 10 kilomegacycles and 30 kilomegacycles respectively) from the low frequency of the crystal-controlled oscillator. The final power which is available is generally only a few microwatts. Such a measurement technique is further limited by the instability of temperature-dependent crystals, as well as by the aging of the many multiplier stages which must be employed. Nevertheless, the accuracy obtainable with this technique is generally accepted today as a secondardy standard in microwave spectroscopy.

Among other available frequency measuring instruments in the higher RF and microwave frequencies which are in use today, are cavity wavemeters and the like. These devices utilize a cavity whose dimensions are controllable to make it resonant at a single frequency. By comparision to the results obtainable with the technique discussed above, the measurements which can be carried out with cavity wavemeters are very inaccurate. For example, a good, commercially available cavity wavemeter will measure to an accuracy of 5 mcs. in 10,000 mcs., i.e. to an accuracy of .05%. Further limitations of cavity wavemeters arise as a result of their sensitivity to ambient temperature and humidity variations during a given measurement. Additionally, cavity wavemeters are usable over a limited frequency range only. It is generally necessary to use a number of cavity wavemeters in order to get wide coverage of a wide spectrum of frequencies.

None of the presently available high frequency measuring techniques are free from at least some of the foregoing disadvantages. My invention, relates to a method and to apparatus for instrumenting the method utilizing inherently stable nuclear and electron resonances to provide frequency measurements in the higher RF and microwave regions.

It is known that if a sample of material, containing protons which are not "shrouded" by an electron cloud such as water or mineral oil for example is subjected to a steady state magnetic field and to an oscillating magnetic field, these two fields mutually perpendicular, at a particular frequency of the oscillating field a resonance will occur, this resonance being the result of the absorption of energy by the precessing protons. A similar resonance will occur, but at a much higher frequency because of absorption of energy by the electrons. If the same steady-state magnetic field is applied in both cases, the ratio of the two frequencies, that of the nuclear and the electron resonance, can be very accurately calculated. This frequency ratio is a constant and since it is ratio of gyromagnetic ratios, it is referred to herein as the "gyromagnetic constant." As used herein and in the claims the term "nuclear resonance" and "proton resonance" will be used interchangeably, it being understood that both of these terms have the same meaning.

In accordance with my invention, I provide a sample of a material having free electrons therein to which I apply the frequency which I desired to measure. This sample is located in a variable static magnetic field, this static field being normal to the direction of the magnetic field of the unknown signal. By varying the strength of the static field, I can adjust the system to an electron resonance at the applied frequency.

I also provide, in the same static magnetic field a sample containing protons by means of which a nuclear resonance may be obtained. With the static magnetic field set at the same level at which the electron resonance was obtained, another electromagnetic signal is applied to the sample containing protons, in a manner such that its magnetic component is at right angle to the static field. The frequency of this latter signal is variable. By adjusting this variable frequency a resonance will be observed at a frequency which is below 30 mcs. and which can be measured accurately by means of conventional techniques. The unknown frequency can now be determined with the same accuracy with which the known frequency can be measured since it is a function of the known frequency and of the gyromagnetic constant previously defined. Accordingly, accurate frequency measurements at electron resonance frequencies may be carried out with this method.

It is, accordingly, a primary object of the present invention to overcome the disadvantages which are inherent in the high frequency measurement methods heretofore employed and to provide measuring and calibrating methods which are simple, accurate and reliable.

It is another object of this invention to provide apparatus for instrumenting the foregoing methods which is relatively simple in construction and which is insensitive to changing ambient conditions.

Other objects of the invention will in part be obvious and will in part appear hereinafter.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings, in which.

I. Theoretical Considerations

Figure 1:
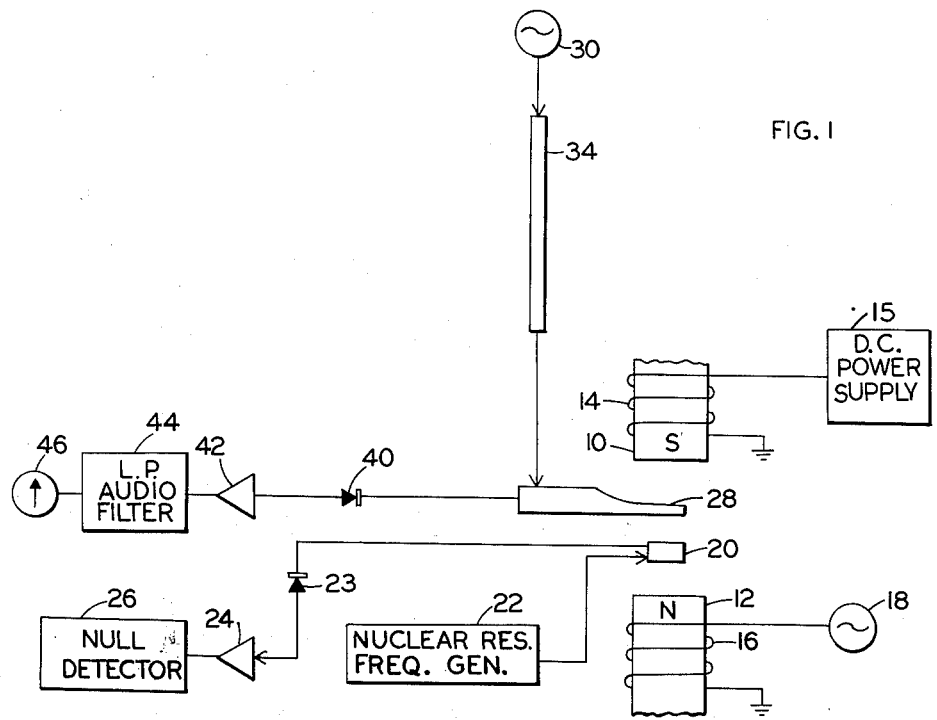
FIG. 1 is a diagram partially in block form and partially pictorial, showing one embodiment of an improved wavemeter incorporating my invention.

It has long been known that there are precessional frequencies peculiar to unpaired, or free, electrons and to some nuclei which constitute proton sources i.e. in which a proton in the nucleus exhibits an observable magnetic moment. If the frequency of an applied electromagnetic signal is matched to these precessional frequencies under proper conditions a resonance-absorption condition may be set up. The precessional frequencies are proportional to the magnetic field strength in which the nuclei, or the unpaired electrons are placed. Thus, the nuclear resonance frequency, $f_n$, is defined by the equation:

$$f_n = \gamma_n H_0$$

where $\gamma_n$ = a constant which depends upon the mass of the proton and is 4.424763 kc./gauss, and $H_0$ = the intensity of the steady state magnetic field in gauss.

Similarly, the electron resonance frequency, $f_e$, is defined by the equation $$f_e = \gamma_e H_0$$

where $\gamma_e$ = a constant which depends on the mass of the electron and is 2.802490 megacycles/gauss.

An examination of these two equations will show that the frequency of the energy which must be supplied to a nuclear system or to an electron system in order to observe a resonance-absorption condition is a function of the steady-state magnetic field in which the nucleus or the free electrons are located. In practically achievable magnetic fields of the order of a few thousand gausses, nuclear absorption occurs between 10 to 20 megacycles while electron absorption occurs between 6.5 to 13.0 kilomegacycles. In order to excite such transitions in a magnetic resonance process, it is necessary to supply an oscillating magnetic field, i.e. electro-magnetic radiation, in which the magnetic vector oscillates in a plane that is perpendicular to the steady-state or static magnetic field. The oscillating magnetic field must also be circularly polarized. The application of such an oscillating circularly polarized magnetic field at right angles to the direction of the steady-state magnetic field, causes all the particles which were precessing about the static magnetic field direction and which had their spins aligned by the static magnetic field to undergo a change in their precessional angle. Ultimately, these particles flip over so that their spins are aligned in a different direction. The energy required to carry out this process is the energy which is absorbed from the applied oscillating magnetic field. If this oscillating field has a frequency which is different from the precessional frequency, or if it is circularly polarized in the wrong sense, it will produce only perturbations of the moving particles, and substantial amounts of energy will not be absorbed.

If the equations above are used to solve for $H_0$, $$\frac{f_e}{f_n} = \frac{\gamma_e H_0}{\gamma_n H_0} = \frac{\gamma_e}{\gamma_n}$$

Substituting the values previously given for $\gamma_e$ and $\gamma_n$, $$\frac{f_e}{f_n} = \frac{2.802490}{4.25763} \text{ megacycles/gauss; or, kilocycles/gauss}$$

$f_e = 658.2277 f_n$, where the number 658.2277 is termed the gyromagnetic constant.

It will be seen from the foregoing relationship that, if either one of the two resonant frequencies is known, the other resonant frequency can be calculated. The frequency at which nuclear resonance occurs is sufficiently low so that it may be determined accurately by the use of a crystal-controlled oscillator and counter as described above. Thus, by measuring the frequency at which a nuclear resonance occurs with a crystal-controlled oscillator-counter, for a given steady-state magnetic field, the field itself may be determined to an accuracy of one part in $10^6$ or $10^7$. If an electron resonance sample is placed in this same field, the frequency at which an electron resonance occurs, although much higher than the nuclear resonance may be determined to a corresponding accuracy.

II. Construction and Operation

With reference now to the drawings, FIG. 1 illustrates one instrumentation of the method which forms the subject matter of my invention. With the apparatus shown, the measurement of an unknown high frequency can be carried out or, alternatively, a secondary frequency measuring device can be calibrated.

An electromagnetic having a C-shaped core whose pole pieces 10 and 12 are illustrated, sets up a steady-state magnetic field in the gap between the pole pieces in the vertical direction of the drawing. In a preferred embodiment of the invention, the field intensity is approximately 3000 gausses. The core of the magnet carries at least one excitation coil 14 which is energized from a variable D.C. power supply 15. Also, at least one of the pole pieces carries a Helmholtz coil 16 which is energized by an audio oscillator 18. The Helmholtz coil is adapted to superimpose a low intensity, magnetic audio frequency field on the steady-state magnetic field. The frequency of the audio oscillator is preferably between 60 and 1000 cycles.

A hollow RF probe 20, which may consist of an inductive tank coil, is positioned in the gap between the pole pieces and contains a nuclear sample, e.g. water or mineral oil, which constitutes a source of protons. The probe 20 is energized from a source of electromagnetic energy whose frequency is variable over the appropriate range, and which is accurately controlled and measured. In practice, a calibrated oscillator capable of providing an output signal in the frequency range from 140 kc. to 16 megacycles, and whose frequency may be read from a dial setting to an accuracy of 1 part of $10^5$ has been found satisfactory for the source 22. An oscillator of this type may be coupled to the probe 20 by its tank circuit coil, for example.

The output of the probe 20 is connected to a demodulator 23, illustratively shown as a diode rectifier which is connected to an amplifier 24. The output of the amplifier 24 is applied to a null detector 26 which will be hereinafter described.

A second probe 28 consists of a tuneable waveguide cavity which supports the $TE_{01}$ mode of propagation and is placed as closely as possible to the probe 20. Close positioning of the two probes exposes them as nearly as possible to the same magnetic field intensity and reduces the chance of errors caused by a non-uniform magnetic field in the gap between the magnetic pole pieces 10 and 12. In a preferred embodiment, the sample contained within the probe 28 consists of a paramagnetic salt, such as for example diphenyl-picryl-hydrazyl

This sample is placed near the right hand end of the cavity 28 at a point of maximum steady-state magnetic field $H_0$. The cavity 28 is preferably frequency-tuned by means of an adjustable plunger (not illustrated) to which input and output loops are attached. Basically, therefore, this is a transmission cavity which absorbs energy from an oscillator connected to the input loop only when it is tuned to resonate at the applied frequency. It will be understood, however, that the cavity, in addition to its own tuned resonance, displays an additional resonance effect due to the energy absorption on the part of the paramagnetic salt when the critical electron resonance frequency $f_e$ is applied to the cavity.

An unkown high frequency signal whose frequency is to be measured and which may have a frequency between 100 mcs. and 10,000 mcs., is supplied by a signal source 30 and this signal is coupled to the probe 28 by the waveguide 34. The output signal from the probe 28 is applied to a demodulator 40, and the demodulated signal is amplified by amplifier 42, and after passing through a low pass audio filter 44 is applied to the indicator 46.

To measure the frequency of the signal source 30, the transmission cavity 28 is tuned approximately to resonance so that a substantial radio frequency signal is being passed by the cavity. A sharp absorption of this signal will then indicate a resonance condition.

The steady-state magnetic field applied between the pole pieces 10 and 12 is modulated by the audio oscillator 18, and accordingly the signal passed to the detector 40 will include a component modulated at this frequency. When detected this modulated component will provide a signal at the fundamental frequency of the audio signal generator. Filter 44 is a low pass audio filter which passes this fundamental component, but not higher harmonics to the detector 46. When the magnetic field in which probe 28 is located is exactly adjusted for an electron resonance, the fundamental component of audio modulation will disappear and the signal passed by the cavity 28 will be modulated only by second and higher harmonics (depending upon the shape of the resonance curve) of the audio frequency modulating signal. However, because of filter 44, the detector 46 is responsive only to the fundamental of the modulating frequency. Hence an electron resonance is indicated by a sharp null on the indicator 46.

Accordingly after cavity 28 is tuned, the current through winding 14 is varied until an electron resonance occurs in the crystals in the probe 28, as indicated by a null on indicator 46.

Having achieved an electron resonance, the steady-state magnetic field is held constant and the frequency of the nuclear resonance frequency source 22, is adjusted until a similar null is obtained on the null indicator 26, this null indicator being similar to that described in connection with the electron resonance circuit described above, in that it incorporates both a low pass audio filter and an indicator.

Theoretically, the energy absorption due to nuclear resonance of the nuclear sample contained in the probe 20, should occur at a single frequency $f_n$ of the nuclear resonance frequency source. Practically however, since the sample is not a true point sample, the magnetic field may vary over the volume which the sample occupies. When this condition holds true, the response will be spread over a narrow band of frequencies. This spread is called the line width of the response and is extremely narrow when the steady-state magnetic field is uniform.

Although the accuracy of the nuclear reference frequency source 22 may be only one part in $10^5$, an accuracy of one part in $10^6$ or $10^7$ can be obtained if more than one reading is taken. Once the nuclear resonance frequency is known, the frequency of the source 30 can be determined to this same accuracy by multiplying the nuclear resonance frequency by the gyromagnetic constant.

Figure 2:
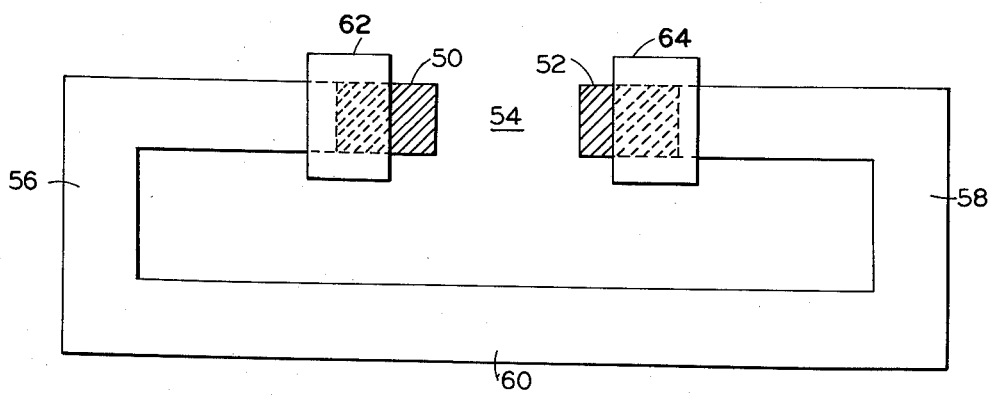
FIG. 2 is a side elevation of a magnet structure which may be used in connection with the apparatus of FIG. 1.

Certain disadvantages are inherent in the electromagnet which is illustrated in the apparatus of FIG. 1. A more uniform steady-state magnetic field is obtainable by using the permanent magnet illustrated in FIG. 2. With this arrangement, a uniform steady-state magnetic field is provided whose field intensity may be varied between approximately 350 gausses and 3500 gausses. A pair of pole pieces 50 and 52 define a flux gap 54 between them in which the sample probes are positioned. The pole pieces consist of magnetic material and directly abut the legs 56 and 58 of the C-shaped steel yoke. The legs, in turn, abut a neutral zone 60 of the yoke. A pair of steel shunt rings 62 and 64 are slidably disposed on the legs of the yoke and are adapted to expose a variable amount of the pole pieces. Normally, flux leakage occurs between the pole piece 50 and the leg 56 and between the pole piece 52 and the leg 58. By varying the horizontal position of the steel shunt rings, it is possible to control the amount of flux leakage and thereby control the effective steady-state magnetic field in the gap. Thus, by moving the shunt rings 62 and 64 toward each other, the flux leakage is increased and the field strength is decreased. The opposite effect results when the shunt rings are moved apart. The movement of the shunt coils is preferably synchronous and can be effected with great precision by means of suitable gearing so that both rings move to increase or decrease the flux leakage simultaneously. Under certain conditions, the apparatus illustrated in FIG. 1 is subject to magnetic field distortion, even though the permanent magnet which is illustrated in FIG. 2 is employed. When the tunable cavity probe 28 and the inductive coil probe 20 are positioned in the same steady-state magnetic field, they may distort the field and react on each other. In this case, the two samples are not exposed to fields of like intensity, nor to a field which is homogeneous throughout the volume occupied by the sample. Resultant errors may be due to any one of these causes or to a combination thereof. Thus, they may be due to the physical size of the two samples, the field distortion due to the presence of one sample with the other, or due to the lack of homogeneity of the magnetic field itself throughout the volume which is taken up by both samples.

Figure 3:
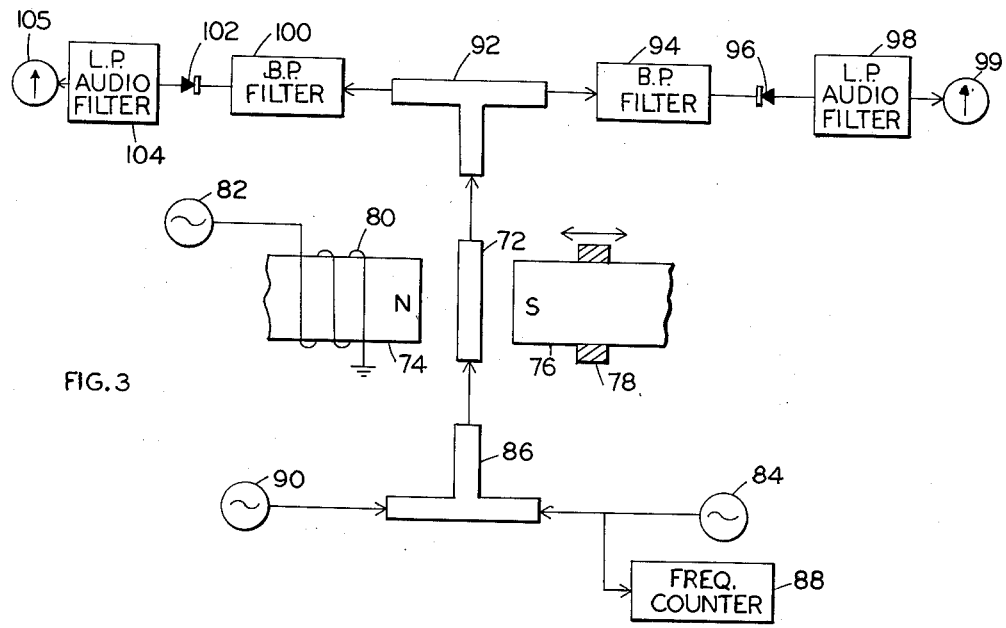
FIG. 3 is a block and line diagram of another embodiment of a wavemeter made according to my invention.

The apparatus which is illustrated in FIG. 3 overcomes these disadvantages by combining both the electron resonance and nuclear resonance samples in a single substance which is contained in one sample holder. This is done by dissolving a crystalline form of the paramagnetic salt (diphenyl-picryl-hydrazyl) in water or mineral oil. Alternatively, proxylamine disulfinate ions, $$(ON(SO_3)_2)+$$

can be used in an aqueous solution while, by some dynamic chemical process, the free radical  is kept active as a source of protons. Such solutions exhibit respective nuclear and electron resonance phenomena. Even if there is an interaction between the nuclei and the electrons, it is still possible to determine the two resonance effects and, by a suitable initial calibration, to determine the new proportionality constant.

In this context, Overhauser has discovered that if a single substance is used to provide both sources, i.e. a source of electrons and a source of protons, the interaction which occurs can enhance the intensity of the proton resonance and shift the resonant frequency of the electrons ("Polarization of Nuclei in Metals," A. W. Overhauser, page 411, Physical Review, vol. 29, No. 2, October 1953). It will be clear that this effect may be used to advantage in the invention herein. Korringa carried the work of Overhauser one step further and showed that the same phenomenon can be observed in paramagnetic salts in which the nuclei of the paramagnetic ions have spin ("Orientation of Nuclei by Saturation of Paramagnetic Resonance," Physical Review 1953).

The apparatus illustrated in FIG. 3 employs a coaxial probe 72 which allows the simultaneous passage of low RF frequencies for determination of the nuclear resonance and of microwave frequencies in the TEM mode for determination of the electron resonance. The volume of the sample holder 72 is approximately 1 cubic centimeter, depending to some extent on the material used and on the band width of the observed resonance. A permanent magnet includes a pair of magnetic pole pieces 74 and 76. These pole pieces define the gap in which the coaxial cavity sample holder 72 is disposed at right angles to the direction of the steady state magnetic field. For the sake of clarity, a single moveable steel shunt ring 78 similar to the rings 62 and 64 of FIG. 2 is illustrated in connection with one of the pole pieces, although it will be understood that the pole piece 74 also carries such a ring. One or both of the pole pieces may carry a Helmholtz coil 80 which is energized from an audio oscillator 82. This coil is so positioned that it superimposes a weak magnetic field at audio frequency on the high-intensity steady-state magnetic field for modulation purposes, as previously described. A stable low frequency oscillator 84 for generating the nuclear resonance signal is coupled to one arm of a first coaxial T-section 86 and is adapted to apply energy thereto at a low RF frequency which is variable between approximately 140 kc. and 16 mcs. The output of the oscillator 84 is further coupled to a frequency counter 88 to measure the nuclear resonance frequency with an accuracy of at least one part in $10^5$ and preferably one part in $10^6$. The signal having energy at an unknown microwave frequency which may vary between 100 mcs. and 10,000 mcs. is applied to the opposite arm of the coaxial T-section 86 from a microwave source 90. The third arm of the T-section 86 is coupled to the input of the sample holder 72 whose output, in turn, is connected to one arm of a second coaxial T-section 92. The second arm of the T-section 92 is coupled to a band pass filter 94. The pass band of the filter 94 extends approximately between 140 kc. and 16 mcs. to cover the frequency range of the stable low frequency oscillator 84. The output of the band pass filter 94 is coupled to a demodulator 96 and is subsequently applied to a low pass audio filter 98 and indicator 99. If desired, the signal may be amplified after demodulation and before application to the filter 98. The third arm of the coaxial T-section 92 is coupled to a microwave band pass filter 100 which has a pass band that includes the frequency range of the microwave source 90. The output of the band pass filter 100 is coupled to a demodulator 102 which in turn is coupled to a low pass audio filter 104 and indicator 105. The signal may again be amplified, if necessary prior to its application to the filter 104.

Except for the activity within the sample holder 72, the operation of the apparatus illustrated in FIG. 3 is similar to that shown in FIG. 1. In order to determine the unknown frequency at which energy is applied by the source 90, the steady-state magnetic field is varied in intensity by moving the shunt rings until an electron resonance absorption effect is indicated by the null detector 105. The band pass filter 100 passes only signals having the proper microwave frequency to the demodulator 102. As in the case of the aparatus of FIG. 1, the microwave energy is modulated at a low audio frequency by the low intensity audio frequency variations in the magnetic field generated by the Helmholtz coil 80.

With the shunt coils fixed at the position where electron resonance was obtained, the frequency of the output signal of the oscillator 84 is varied until an absorption effect is indicated by a zero signal on indicator 99. This absorption effect shows that the nuclear resonance frequency $f_n$ has been reached. This frequency is determined by the frequency counter 88 and can be converted into the unknown frequency of the source 90 by multiplying it by the gyromagnetic constant. In a preferred embodiment, a dual scale on the frequency counter simultaneously provides both frequency measurements.

Since, for any given unknown input frequency, the desired condition is to obtain electron resonance and nuclear resonance simultaneously, the operation of the entire system may be made completely automatic. This is possible because of the fact that the frequencies at which these resonances occur, are linearly related by virtue of the gyromagnetic constant. Apparatus for carrying out this operation automatically is illustrated in FIG. 4, applicable reference numerals having been carried forward from FIG. 3.

Figure 4:
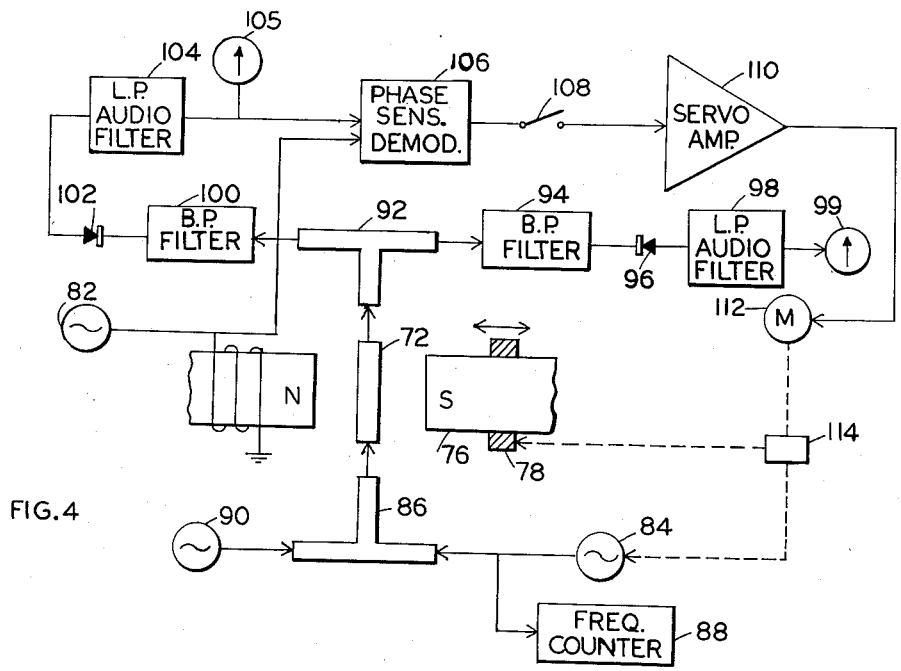
FIG. 4 is a block and line diagram of an automatically operated wavemeter of the type illustrated in FIG. 3.

As shown in FIG. 4, I provide a phase sensitive demodulator 106 to which the audio frequency signal supplied to indicator 105 is also supplied. The audio modulating signal supplied by generator 82 is also supplied to demodulator 106 as a reference signal. The output signal from the demodulator, a direct voltage whose polarity depends on the phase of the audio frequency signal passed by filter 104 with respect to the audio modulating signal is connected as an input signal through a switch 108 to a servo power amplifier 110. The output signal from amplifier 110 drives servo motor 112, whose shaft is mechanically connected, through an appropriate gear box 114 to position the steel shunt rings 78 and to control the frequency of nuclear resonance oscillator 84.

Before operating the wavemeter shown in FIG. 4 automatically, switch 108 is opened (thus opening the servo loop) and the wavemeter is adjusted as previously described to measure the frequency of source 90. When correctly adjusted, no signal will be indicated by the indicator 105 and hence demodulator 106 will not be producing an output signal. The switch 108 may now be closed without affecting system operation.

If, after switch 108 is closed, the frequency of source 90 changes, the previous setting of the shunt rings will not provide the proper magnetic field for an electron resonance and an audio frequency signal will be produced at indicator 105, the phase of this signal indicating the direction of error. This error signal will drive motor 112 through demodulator 106 and power amplifier 110 to reposition the rings 78 to the correct position for an electron resonance, at the same time changing the frequency of the nuclear resonance oscillator 84 to maintain a nuclear resonance. The nuclear resonance is linearly related to the electron resonance and hence the setting of oscillator 84 may be varied directly with changes in frequency of source 90. If for any reason a nuclear resonance is not obtained, a reading other than a null indication will be observed on indicator 99. The indicator thus serves as a check for proper system operation.

If it is desired to control additional apparatus in accordance with the frequency of the source 90, it is of course possible to do so by mechanically coupling to the output shaft of the servo 112.

Although the instrumentation of the method which forms the subject matter of my invention herein is only somewhat simpler than the equipment discussed above which is commonly in use today, the accuracy and reliability obtainable with my method and apparatus is far superior to that heretofore available. As previously pointed out, prior methods generally depend on the multiplication of the frequency of a stabilized low frequency standard by zero beating or IF heterodyning the amplified harmonics. Because of the many stages of multiplication which are necessary to arrive at X- or K-band frequencies the available output power is very small. Further limitations of this method arise from the instability of temperature-dependent crystals, aging tubes, and the critical tuning of the many multiplier stages. In contrast, the methods and apparatus which I have disclosed are not subject to these influences and hence provide a far more reliable and precise measurement which is suitable for modern high-precision requirements.

The preferred embodiments of the method and apparatus herein disclosed are intended to be illustrative only. Numerous modifications, departures and equivalents will now occur to those skilled in the art, all of which fall within the true spirit and scope of this invention.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A wavemeter for measuring an unknown frequency comprising, a cavity adapted to hold a sample, said sample including a material having nuclear protons capable of exhibiting resonance effects and a material having therein free electrons, means for applying a first magnetic field at said unknown frequency to said sample in a first direction, means for applying a steady-state magnetic field to said sample in a second direction normal to said first direction, means for varying the intensity of said steady-state magnetic field to bring about electron resonance of said sample in cooperation with the field applied at said unknown frequency, means for modulating said magnetic field at an audio frequency, means for applying a second magnetic field at a known frequency to said sample in said first direction, means for varying said known frequency to bring about nuclear resonance of said sample in cooperation with said steady state magnetic field at an intensity set for electron resonance, means for detecting the respective resonance effects. said detecting means comprising sensing means responsive to said audio frequency, said nuclear resonance frequency being related to said electron resonance frequency by a predetermined constant and said unknown frequency being equal to the product of said known frequency and said predetermined constant.

2. A microwave frequency wavemeter comprising a coaxial cavity sample holder, said sample holder permitting the simultaneous passage of low radio frequency energy and of microwave energy, a pair of T-sections each having one arm coupled to the input and output respectively of said sample holder, a sample disposed in said sample holder, said sample comprising a paramagnetic salt in solution in a liquid, said liquid containing nuclear protons capable of exhibiting nuclear resonance effects, said paramagnetic salt constituting a source of free electrons, means for providing a high intensity steady magnetic field, means positioning said sample holder in said magnetic field in a direction such that its axis is perpendicular to said field direction, means for varying the intensity of said steady magnetic field, means for modulating said magnetic field at a low audio frequency, a variable, low radio frequency oscillator having its output coupled to second arm of the input T-section, a frequency counter coupled to the output of said low radio frequency oscillator, means for coupling an input signal of unknown frequency to the third arm of said input T-section, a first band pass filter coupled to a second arm of the output T-section, said first band pass filter admitting frequencies in the low radio frequency region only, a second band pass filter coupled to the third arm of said output T-section, said second band pass filter admitting frequencies in the microwave region only, a demodulator coupled to the output of each of said filters, and means indicating the presence of said audio modulating signal connected to the output of said demodulators.

3. The apparatus defined by claim 2 which includes a servo means responsive to the output signal from the demodulator associated with said second band pass filter for varying the intensity of said steady magnetic field to maintain the electrons in said sample in resonance with said unknown frequency.

4. The apparatus of claim 3 which includes means coupled to said servo means for varying the frequency of said low radio frequency oscillator as the intensity of said steady magnetic field is varied.

References Cited in the file of this patent

UNITED STATES PATENTS 2,837,712     Mackey _____ June 3, 1958

FOREIGN PATENTS 1,180,455     France _____ Dec. 29, 1958

OTHER REFERENCES

Feher: Physical Review, vol. 103, No. 2, July 1956, pp. 500 and 501.

Montchane et al.: Academie des Sciences, Comptes rendus, vol. 246, No. 12, March 1958, pp. 1833 to 1835.